May 3, 1938.  P. V. W. GELL  2,115,765
MEANS FOR THE MANUFACTURE OF MOLDED GLASSWARE
Filed Feb. 12, 1936  3 Sheets-Sheet 1
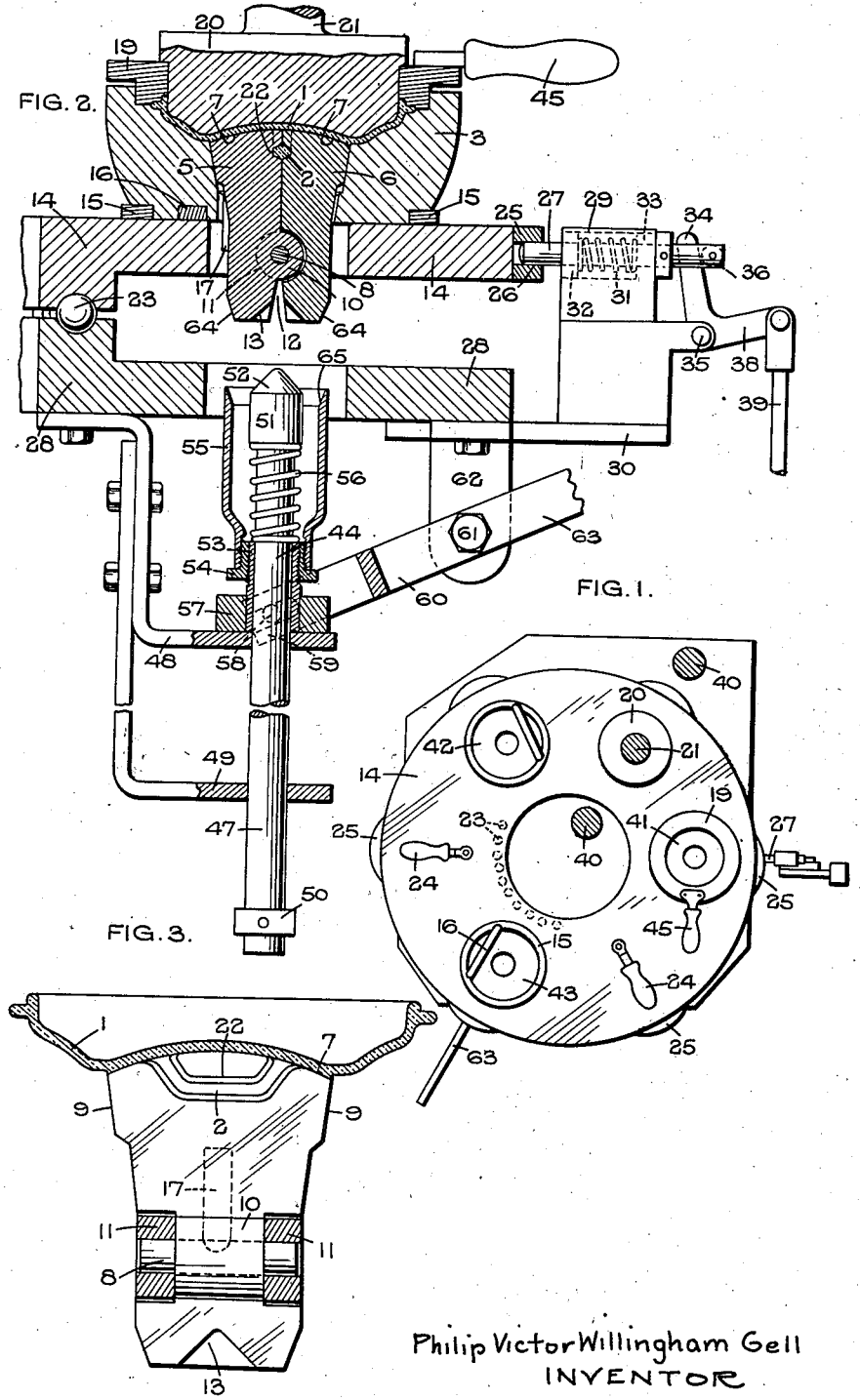

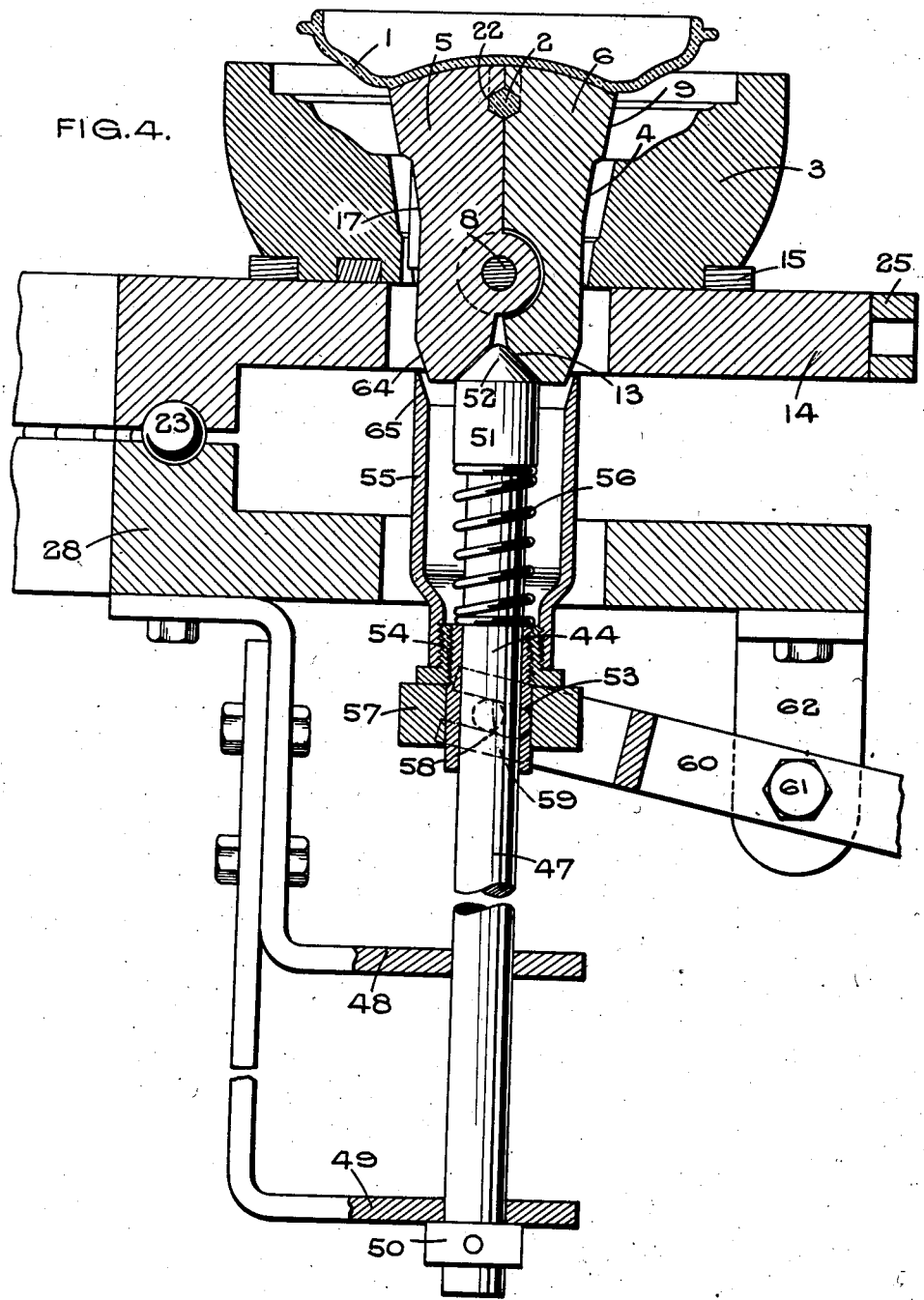

May 3, 1938. P. V. W. GELL 2,115,765
MEANS FOR THE MANUFACTURE OF MOLDED GLASSWARE
Filed Feb. 12, 1936 3 Sheets-Sheet 3

Philip Victor Willingham Gell
INVENTOR
By [signature]
his ATTY.

Patented May 3, 1938

2,115,765

UNITED STATES PATENT OFFICE

2,115,765

MEANS FOR THE MANUFACTURE OF MOLDED GLASSWARE

Philip Victor Willingham Gell, Birmingham, England, assignor to The British Heat Resisting Glass Company, Limited Application February 12, 1936, Serial No. 63,517
In Great Britain February 19, 1935

1 Claim. (Cl. 49—35)

It is well known in connection with the molding of glass-ware that it is necessary in many instances to use divided or segmental molds or dies which can be moved apart radially or otherwise outwardly to release an undercut portion of the molded article.

It is well known to glass manufacturers that as the molding pressure exerted to form the article tends to force the parts or segments apart, the parts or segments of such divided molds require to be kept in very close contact in order to prevent—(a) the formation of fin on the molded glass-ware at the junction of the parts or segments, and (b) to prevent rapid wear at adjacent surfaces of the parts or segments, such as always takes place if the parts or segments are not kept in very intimate contact.

For the above reasons many expedients have been tried and are in use for retaining the parts or segments of divided molds or dies in close contact during the molding of glass, and the use of these expedients considerably complicates the structures which are used and increases the expense of their production and upkeep.

One of the objects of the present invention is to reduce the cost of manufacture and upkeep of the molding apparatus by constructing the molds in such a manner that the necessary intimate contact between the adjacent surfaces of the parts or segments of the divided die will always be maintained under working conditions.

According to one part of the present invention, I provide a mold for the manufacture of glassware, including a divided die, a support at the sides or periphery of the said divided die, either the divided die or the support, or both, having conical or tapering sides, so that the molding pressure automatically tends to close the parts of the divided die together.

For instance, the divided mold or die as a whole may be provided with a tapering or conical exterior, the taper being in the same direction as that in which the pressure is to be applied, and this divided mold or die rests in an opening in a support, the walls of which are formed to a similar taper, so that when the molding pressure is exerted upon the parts of the divided die, a component force will be produced acting upon the parts of the divided die in a radial direction towards the centre which forces the parts into intimate contact.

The periphery of the divided die and the walls of the opening into which it fits, may be conical in the case of a die divided diametrically or radially. If the die is of rectangular form, then one or both parts of the die may be formed with, or engage, opposed inclines so that the molding pressure will tend to force them into contact.

It is well known to mold such an article at one operation by using a mold, the outer and major portion of which is not divided radially, the said major portion having an opening at the position where the undercut projection is to be formed, and a divided mold being provided under this opening. By using such an arrangement, the article can be molded in one operation, but owing to the necessary thickness of the major or outer part of the mold, it is necessary to form the article with a deep shoulder between the main part of the article and the undercut projection. The depth of this shoulder can be reduced in some kinds of glass, but it is at its maximum when the article is made of heat resisting glass.

Another object of the present invention is to simplify the manufacture of such glass articles without materially increasing or lengthening the visible radial line on the surface of the glass which is inseparable from the use of a divided die.

According to this part of my invention, such articles are molded in a die having a divided portion movably located in an opening in an undivided portion, and the pressing or molding is completely effected at one operation, after which either the divided portion of the die is moved relatively to the undivided portion, or vice versa, the position after such movement permitting of the separation of the parts or segments of the divided die to release the article.

I may make use of both of the main features of my invention by constructing a die with a major or outer portion having a conical recess at the centre in which is located a divided die, the sides of which are also conical.

With such an arrangement the molding pressure forces the parts of the divided die into intimate contact owing to the taper of the recess in which it is mounted, while the molding of an article having an undercut projection is effected in my die at one operation, the separation of the parts of the divided portion of the die being effected either by raising the divided portion of the die until its head is clear of the undivided portion of the die, so that the parts of the divided die can be separated, or by lowering the main or undivided part of the die until it is clear of the head of the divided part of the die.

My invention is particularly applicable to the molding of covers for glass dishes where it is desired to mold integrally a knob which is undercut, or some other form of undercut handle at about the centre of the lid, and it is not desired that the surface of the lid shall show radial or approximately radial lines extending to its periphery as would be the case if a radially divided die only were employed, nor to incur the wear and tear on the joints of a divided die of the usual type and the comparatively excessive maintenance costs resultive therefrom.

Referring to the drawings:—

Figure 1 is a plan view showing a rotary table having provision for carrying three sets of dies, and also having an indication of the position of the press in relation to the table.

Figure 2 is a sectional view in side elevation showing one set of dies and the releasing appliance, the dies being shown in the position which they occupy when molding is taking place.

Figure 3 is a front view of one section of the divided die, the article also being indicated at the top of this view.

Figure 4 is a sectional view in side elevation showing the lower die and the raising device with the divided die in its raised position but before the two halves have been opened or separated.

Figure 5:
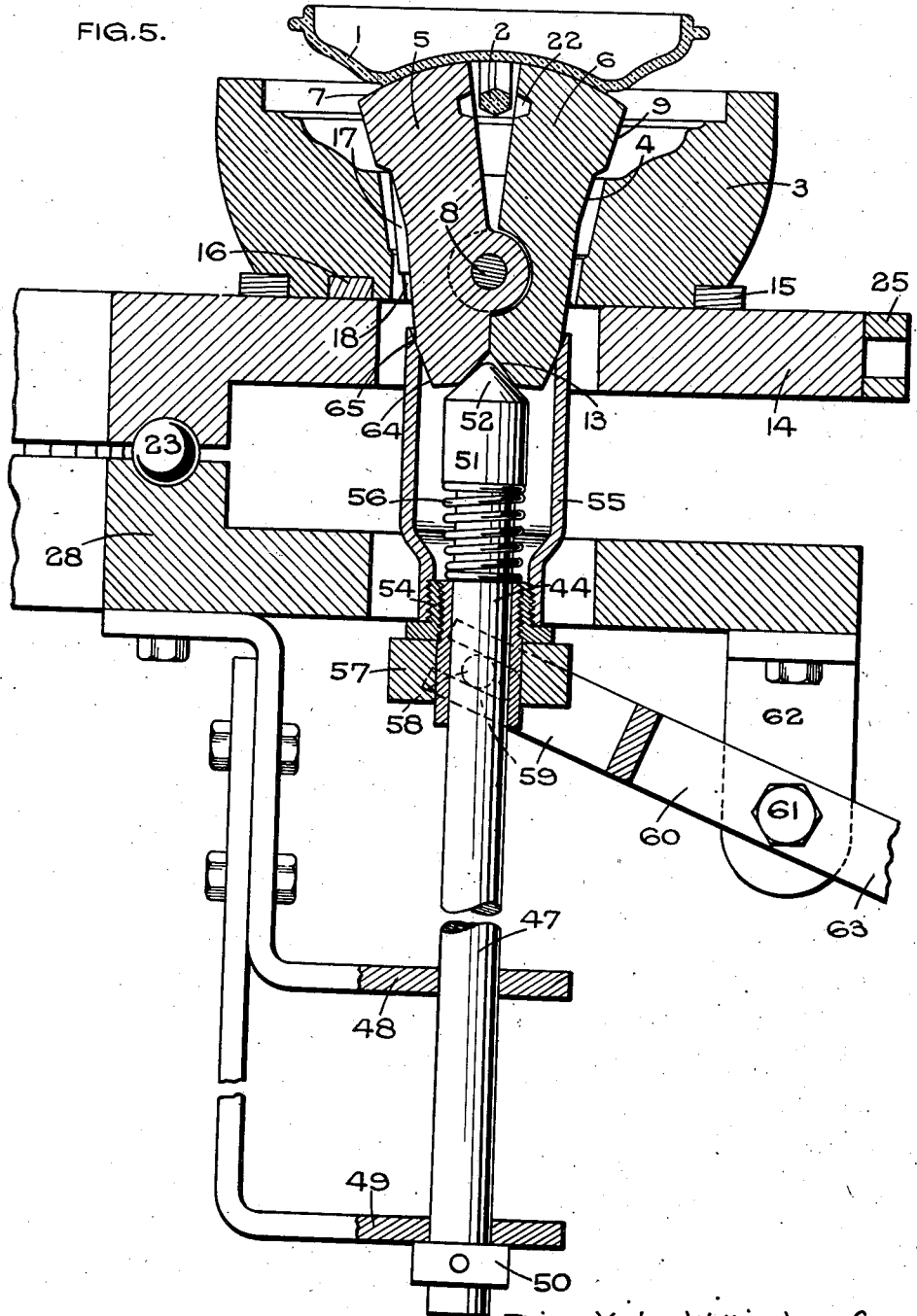
Figure 5 is a sectional view in side elevation showing the lower dies with the divided die in its raised and opened or separated position to allow the article to be removed.

In the construction illustrated, the molded article 1 is the lid of a dish, and it is formed with an integral bridge-like handle 2, the molding of which necessitates the use of a divided die. The invention can be applied equally well to the molding of any other article which has an undercut projection necessitating the use of a divided die for forming the projection.

In the arrangement illustrated, the lower dies consist of a major die 3 which is in the form of an undivided ring and which is formed at the centre with a conical hole 4 containing the two parts 5 and 6 of the divided die.

The parts 5 and 6 of the divided die are pivoted together on a pin 8, and at the top they are provided with part-spherical surfaces 7 struck from the centre 8. It is, however, not essential that the top surface 7 should be part-spherical, and if it is part-spherical it is not essential that the centre of the sphere should be at 8.

The upper surfaces of the parts 5 and 6 may, if desired, be flat, but these surfaces should be designed so that the parts 5 and 6 may make an opening movement by turning them about the axis of the pivot 8.

The upper parts of the parts 5 and 6 are formed with conical surfaces 9 which correspond with the hole 4, so that when the molding pressure is applied, this being a downward force along the axis of the mold, the co-acting surfaces 4 and 9 will produce a horizontal component which tends to close the upper parts of the members 5 and 6 together.

The member 5 is provided with a lug 10, and the member 6 is provided with a pair of lugs 11, and these lugs are mounted on the pivot 8.

The two members 5 and 6 are extended below the lugs 10 and 11, and a gap 12 is formed between the extensions so as to permit the parts 5 and 6 to make an opening movement at the top. Further, the lower extensions of the parts 5 and 6 are conically recessed as shown at 13.

If the article to be molded is of circular form throughout, it is not necessary to provide means to prevent the die 3 from rotating on its own vertical axis, or to prevent the divided die 5, 6 from turning in relation to the die 3, but if the article to be molded is not of circular form, it is necessary to provide means for positioning the die 3 on the table 14, and also to prevent the divided die 5, 6 from turning in relation to the die 3.

In order to locate the die 3 on the table 14, the table is provided with a ring 15, and the ring 15 is provided with a locating bar 16. The underside of the ring 3 is recessed to fit over the ring 15 and the bar 16.

Further, one part 5 of the divided die is provided with a key 17 engaging in a keyway 18 in the opening in the die 3.

The upper die is in two parts, one part 19 being in the form of a ring fitting into the top of the die 3, and the other part 20 being carried by the ram 21 of a press. Neither die 19 nor 20 is divided radially.

The two parts of the divided lower die 5, 6 are recessed at their inner surfaces as shown at 22 to provide for the molding of the handle 2.

Referring to Figure 1 which illustrates the table 14, this table has provision for carrying three sets of the dies at three equally spaced positions. The table is mounted for rotation and is supported on a ball race indicated at 23, and is provided with handles 24 by which it may be pulled round by hand. Further, the periphery of the table is provided with six projections 25, each of which is provided with a radial opening 26 (see Figure 2). Each of the openings 26 is adapted to be engaged in turn by the nose of a spring bolt 27.

The table 14 is supported on the ball race 23 carried by a lower fixed table 28, and the casing 29 in which the bolt 27 is slidably mounted is carried by a bracket 30 mounted on the fixed table 28.

Within the casing 29 is a spring 31 acting on a collar 32 which is pinned to the bolt 27. At its outer end the spring finds an abutment against a ring 33 secured in the casing 29.

The bolt 27 protrudes through the outer end of the casing and through the ring 33, and it is there provided with a slot which is engaged by one arm 34 of a lever pivoted at 35 on an extension of the bracket 30.

The lever arm 34 engages a roller 36 mounted in the slot in the end of the bolt 27.

The lever 34 is provided with a second arm 38 to which a link 39 is connected. This link may be operated by means of a foot pedal so that the bolt 27 can be conveniently withdrawn from the hole 26 when desired to allow of the rotation of the table 14. When the table comes to rest in the desired position, the pedal is released and the bolt 27 engages a fresh hole 26.

In Figure 1 the pillars of the press are indicated at 40, and the ram 21 of the press which carries the die 20 is also indicated.

In Figure 1 the loading position for the dies is indicated at 41. After the dies situated at 41 have been loaded with a piece of glass in a plastic state, the bolt 27 is withdrawn and the table is turned until the dies bearing the plastic glass are brought under the ram of the press. The table is retained in its new position by means of the bolt 27, and when in this position the ram of the press is lowered to form the article. When this operation is complete, the ram of the press is raised and the table makes a further rotary movement, bringing the dies containing the molded article to the position 42. In the meantime the dies which were originally at the position 43 have now reached the position 41 and are ready for loading.

When the dies bearing the article reach the position 43, they are located over the appliance indicated generally at 44 in Figure 2, which raises the divided die and which is capable of opening the two parts 5 and 6 of the divided die to allow of the article 1 to be removed.

As the die bearing the article comes into the position 43, the operator first removes the ring 19 by means of the handle 45 and places it on the table beside the dies. The operator then operates the appliance 44 so as to raise the die parts 5 and 6 and to separate them so that the article 1 can be removed.

The machine can be worked by three operators, one of which supplies a piece of plastic glass to the dies at position 41. The second operator severs the plastic glass from the rod by which it is carried, and the second operator also works the press and operates the bolt 27.

The third operator removes the ring 19 and operates the appliance 44 and removes the finished articles from the dies and replaces the ring 19.

The appliance 44 for raising the divided die 5 and 6 and also opening it to permit of the removal of the article, is illustrated in Figures 2, 3 and 4. This appliance comprises a pin 47 mounted for vertical sliding movement in two spaced brackets 48 and 49, both of which are carried on the fixed table 28.

Near its lower end the pin 47 is provided with a collar 50, and at its upper end it is provided with a head 51 terminating in a conical nose 52 adapted to engage in the conical recess 13 in the parts 5 and 6.

The upper part of the pin 47 carries a slide which may be in the form of a sleeve made in three parts 53, 54 and 55.

The part 53 can slide on the pin 50, but normally the lower end of the part 53 is kept in engagement with the upper surface of the bracket 48 by a spring 56 operating between the underside of the head 51 and the top of the part 53.

The part 54 screws on to the part 53, and it carries the sleeve 55 which is screwed thereon.

Slidably mounted on the lower part of the member 53 is a collar 57. The lower surface of this collar normally engages the upper surface of the bracket 48, but the collar 57 can be moved upwardly so that its upper surface engages the lower surface of the member 54.

The collar 57 is provided with trunnions 58 which are engaged by forks 59 formed on a lever 60 pivoted at 61 on a bracket 62 fastened to the fixed table 28. The lever 60 is provided with an operating handle 63 which can be seen in Figure 1.

It will be seen that the lower ends of the parts 5 and 6 are of conical form at the exterior. This is indicated at 64. Further, the inner surface of the top of the sleeve 55 is also of conical form as shown at 65.

In operation, after the article 1 has been molded and the centre top die 20 has been raised and the ring 19 removed, the handle 63 is operated to turn the lever 60. The turning of the lever 60 raises the collar 57, and the collar 57 operates on the lower end of the member 54 and raises both the sleeve 55, and through the agency of the spring 56, also raises the pin 47.

The first stage of the raised position is shown in Figure 4, where it is seen that the conical nose 52 is engaging in the recess 13, so that as the parts 5 and 6 are lifted, they are prevented from opening or making any turning movement about the pivot 8, the turning movement being prevented by the nose 52.

Further movement of the lever 60, however, causes the spring 56 to be compressed as the upward movement of the pin 40 is arrested by the collar 50 coming into contact with the bracket 49. Continued movement of the lever 60 compreses the spring and further raises the sleeve 55, causing the conical surface 65 to engage with the conical surfaces 64 on the parts 5 and 6, bringing their lower ends off the nose 52 and simultaneously causing the upper ends to move apart. The sleeve 65 has a short sliding motion over the surfaces 64 to bring about the opening movement of the dies 5 and 6. The final position is shown in Figure 5, and when the parts are in this position, the article 1 can be lifted off.

If required, the third operator may be provided with a fork which he can place under the article when it is in the position shown in Figure 4 and prior to the opening movement of the dies 5 and 6, so that the under surface of the article will not be marked by the sliding of the upper surfaces of the die parts 5 and 6 over the under surface of the article. Further, this provision makes it unnecessary to shape the underside of the article to the part-spherical form shown. The fork can be used to support the weight of the article while the opening movement is taking place.

In the construction shown, the divided dies 5 and 6 are raised in the major die 3 until their head or upper part has sufficient clearance to make the opening movement. It is to be understood that instead of carrying the invention out in this manner, the divided dies may remain stationary and the major die 3 may be lowered to permit of the opening movement of the dies 5 and 6.

Although in the foregoing description and illustrations, I have referred to a rotary table as the support for the molds, I wish it to be understood that the invention can be carried into effect without using a rotary table. For instance, the mold may be supported on a stationary table, and each mold may have means situated beneath it for raising and separating the parts of the divided portion. Alternatively, the mold may be supported on a stationary table, and after the pressing operation has been completed, the mold may be moved manually to one side to a new position which is situated over a device for raising and separating the divided part of the mold.

What I claim then is:—

Apparatus for molding glass comprising an outer mold having an opening, an inner die located in said opening, said inner die comprising two members pivoted together on an axis below said opening and transverse to the centre line of the outer mold, said members being extended below said pivot, means for producing relative endwise movement between said inner die and the outer mold consisting of a pin mounted for endwise sliding movement and adapted to engage between the extended parts of said members, a sleeve associated with said pin for engaging around the extended parts of said members, a stop to limit the sliding motion of the pin, a spring operating between said sleeve and a shoulder on the pin, and means for moving said sleeve in an endwise direction so as to raise the sleeve and pin for a limited distance, after which said sleeve makes a further upward movement and engages said extended parts of the die members so as to rock said members on their pivot.

PHILIP VICTOR WILLINGHAM GELL.